United States Patent
Ali

Patent Number: 5,093,385
Date of Patent: Mar. 3, 1992

[54] METHOD OF ACCELERATING PHOTOINIFERTER POLYMERIZATION, POLYMER PRODUCED THEREBY, AND PRODUCT PRODUCED THEREWITH

[75] Inventor: Mahfuza B. Ali, Woodbury, Minn.

[73] Assignee: Minnesota Mining and Manufacturing Company, St. Paul, Minn.

[21] Appl. No.: 454,374

[22] Filed: Dec. 21, 1989

[51] Int. Cl.[5] ............................................. C08F 2/46
[52] U.S. Cl. ......................................... 522/57; 522/27; 522/28; 522/29; 522/66; 522/90; 528/146; 528/147
[58] Field of Search ..................... 522/57, 66, 99, 27, 522/28, 29; 526/146, 147

[56] References Cited

U.S. PATENT DOCUMENTS 4,421,822  12/1983  Levens .................................. 428/343

FOREIGN PATENT DOCUMENTS 0286376  6/1988  European Pat. Off. .

OTHER PUBLICATIONS

Okuzuwa, Hirai, and Hakishima, Journal of Polymer Science, 7, (1969), pp. 1039-1053.
Otsu et al., *Living Radical Polymerizations in Homogeneous Solution by Using Organic Sulfides as Photoiniferters,* Polymer Bulletin, (1982), pp. 45-50.
Otsu et al., *Living Mono- and Biradical Polymerizations in Homogeneous System Synthesis of AB and ABA Type Block Copolymers,* Polymer Bulletin, 11, (1984), pp. 135-142.

Primary Examiner—Marion E. McCamish
Assistant Examiner—Susan Berman
Attorney, Agent, or Firm—Gary L. Griswold; Walter N. Kirn; Janice L. Dowdall

[57] ABSTRACT

The invention relates to an accelerated photoiniferter polymerization method which involves the addition of a polymerization accelerating amount of a at least one metal compound accelerator during the photoiniferter polymerization process.

Preferably, the metal compound or compounds used are represented by the general formula $M_xL_z$ wherein M is a cation having a valency of z of a metal which is selected from the group consisting of tin, zinc, cobalt, titanium, palladium, and lead;

x is an integer of at least 1;

L is an anion having a valency of x which is selected from the group consisting of $C_{1-20}$ alkyl, -aryl, —OR, $$-O-\overset{O}{\underset{\|}{C}}-R,$$

$NO_3^-$, $SO_4^=$, and $PO_4^{-3}$;

R is selected from the group consisting $C_{1-20}$ alkyl and aryl; and z is an integer of at least 1.

Most preferably, the metal compound is selected from the group consisting of stannous 2-ethylhexanoate, zinc 2-ethylhexanoate and mixtures thereof.

12 Claims, 2 Drawing Sheets

METHOD OF ACCELERATING PHOTOINIFERTER POLYMERIZATION, POLYMER PRODUCED THEREBY, AND PRODUCT PRODUCED THEREWITH

TECHNICAL FIELD

This invention relates to the acceleration of a photoiniferter polymerization method, polymers produced by the method, and products produced with the polymers.

BACKGROUND

Photoiniferter technology is a recently developed technology which allows for the polymerization of block copolymers from various monomers An advantage of photoiniferter technology is that it allows for the "tailoring" of block copolymers made therewith. The control of the polymerization provided by the photoiniferter technology permits "tailoring" of the block copolymers formed thereby so that a polymer having a wide spectrum of physical properties can be prepared. Such high precision tailoring is not possible with previously known polymerization methods such as thermal polymerization.

The term "iniferter", or "photoiniferter" as it is also known, refers to a chemical compound that has a combined function of being a free radical initiator, transfer agent, and terminator, the term "iniferter" being a word formed by the underlined portions of the terms identifying these functions. The photo portion of the term indicates that the polymerization is photolytically induced. This term and its use in the production of block copolymers is well known, particularly because of the work of Takayuki Otsu of the Department of Applied Chemistry, Osaka City University, Osaka, Japan. This work is discussed, for example, in an article by Otsu et al entitled "Living Radical Polymerizations in Homogeneous Solution by Using Organic Sulfides as Photoiniferters", *Polymer Bulletin*, 7, 45–50 (1982), an article by Otsu et al entitled "Living Mono-and Biradical Polymerizations in Homogeneous System Synthesis of AB and ABA Type Block Copolymers", *Polymer Bulletin*, 11, 135–142 (1984), and in European Patent Application No. 88303058.7, Publication No. 0 286 376, publication date Oct. 12, 1988.

Copending U.S. application Ser. No 07/356,650, filed May 19, 1989, which is a Continuation-In-Part of U.S. application Ser. No 7/212,594, Ali, et al., filed June 28, 1988 (assigned to the assignee of the present case) discloses the use of iniferter technology in the preparation of acrylic block copolymers having the requisite physical properties making them suitable for use in pressure-sensitive adhesive compositions. The control of the polymerization permits tailoring of the reinforced acrylic block copolymer to provide a balance of adhesion, cohesion, stretchiness and elasticity to make a successful pressure-sensitive adhesive.

Copending U.S. application Ser. No. 07/212,593, filed June 28, 1988, Andrus Jr. et al., (also assigned to the assignee of the present case) discloses the use of iniferter technology in the preparation of acrylic block copolymers which can be tailored to provide optical clarity and resistance to oxidative and photochemical degradation which are employed to make shaped articles, sheet materials, and the like.

Copending U.S. application Ser. No. 07/393,550, filed Aug. 14, 1989, Kumar, et al., provides novel siloxane iniferter compounds which can be used in making tailor-made vinyl-siloxane block copolymers. The control of the polymerization provided by the novel siloxane iniferter compounds permits "tailoring" of the vinyl-siloxane block copolymers so that a wide spectrum of physical properties can be introduced.

Copending U.S. application Ser. No. 7/393,557, filed Aug. 14, 1989, Kumar, et al., discloses flexible substrates coated with a release coating comprising the vinyl-siloxane block copolymers prepared according to copending U.S. application Ser. No. 07/393,550.

While photoiniferter technology provides a unique way to make precisely tailored block copolymers which cannot be made by conventional techniques, such photopolymerization reactions can sometimes take an extended period of time to occur. Reaction times on the order of 2 to 50 hours, depending upon the components used, with the majority of reactions requiring 24 hours or more have been found to be typical, depending upon the intensity of the radiation with faster reaction times being observed at greater intensities. None of the above references disclose or suggest any methods of accelerating the photoiniferter polymerization processes.

Okuzuwa, Hirai and Hakishima, Journal of Polymer Science, Volume 7, 1039–1053, 1969, discusses the thermal polymerization of acrylates and methacrylates with AIBN (azo-isobutyronitrile) in the presence of $ZnCl_2$ and $SnCl_4$. The thermal polymerizations of Okuzuwa are conducted in bulk since, according to Okuzuwa, $ZnCl_2$ acts as a complexing agent with methyl methacrylate (MMA) resulting in a decrease in activation energy. No solvent was found which dissolved the complex without causing its dissociation. Thus, no polymerization rate acceleration was observed in the presence of solvents.

Levens U.S. Pat. No. 4,421,822 (assigned to the assignee of the present case) teaches that the conventional photopolymerization of acrylates in solution or in film can be carried out in the presence of oxygen wherein oxidizable tin salts are added. However, rate enhancement in the absence of oxygen is not discussed. Moreover, no data is provided on the extent of rate enhancement in the presence and absence of oxidizable tin salts. Furthermore, Levens does not teach or suggest the use of such oxidizable tin salts as accelerators in photoiniferter polymerizations.

A need therefore exists for an accelerated photoiniferter polymerization technique which can substantially increase the reaction rate of photoiniferter polymerization reactions resulting in a more time-efficient photoiniferter polymerization process.

BRIEF DESCRIPTION OF THE INVENTION

We have found an accelerated method of preparing block polymers and copolymers which involves the addition of a polymerization accelerating amount of a metal compound accelerator during the photoiniferter polymerization process.

The invention relates to a method of making a polymer or copolymer which comprises mixing (i) an iniferter represented by the general formula $I(T)_n$, capable upon being subjected to an appropriate energy source of forming a terminator free radical of the formula $nT\cdot$ and an initiator free radical of the formula $I(\cdot)_n$ wherein n is an integer of at least 1, wherein the initiator free radical $I(\cdot)_n$ is a highly reactive free radical capable of initiating free radical polymerization, and the terminator free radical $T\cdot$ is a less reactive free radical which is generally much less capable of initiating free radical polymerization of free radically polymerizable monomer but capable of rejoining with $I(\cdot)_n$ or a free radical polymer segment free radically polymerized with $I(\cdot)_n$ upon termination of the energy source and (ii) a first monomer charge comprising free radically polymerizable monomer, in order to form a first mixture;

exposing the mixture to an energy source capable of forming free radicals I· and nT·;

maintaining the exposure until the free radically polymerizable monomer of the first monomer charge polymerizes with I· to form a free radical polymer segment represented by the formula IA'·;

wherein A' comprises a polymer block comprising polymerized free radically polymerizable monomer of the first monomer charge;

terminating the exposure, whereby $I(A'\cdot)_n$ and nT· combine to form a polymer represented by the formula $I(A'T)_n$ or alternatively maintaining the exposure of $I(A'\cdot)_n$ and nT· to the energy source;

optionally mixing $I(A'T)_n$ or mixing $I(A'\cdot)_n$ and nT· with a second monomer charge comprising free radically polymerizable monomer in order to form a second mixture;

exposing the mixture of $I(A'T)_n$ and the second monomer charge to an energy source capable of forming free radicals $I(A'\cdot)_n$ and nT·, or alternatively maintaining the exposure of $I(A'\cdot)_n$ and nT· which is mixed with the second monomer charge, to the energy source;

maintaining the exposure until the free radically polymerizable monomer of the second monomer charge polymerizes with the free radical $I(A'\cdot)_n$ to form a free radical copolymer segment represented by the formula $I(A'A''\cdot)_n$ wherein A" comprises a polymer block comprising polymerized free radically polymerizable monomer of the second monomer charge;

and terminating the exposure whereby $I(A'A''\cdot)n$ and nT· combine to form a copolymer represented by the formula $I(A'A''T)_n$:

wherein the improvement comprises adding a polymerization accelerating amount of at least one metal compound which is capable of accelerating the free radical polymerization wherein the metal compound is present during the polymerization of at least one monomer charge, and wherein said metal compound does not interact with said free radically polymerizable monomer of said first monomer charge or said free radically polymerizable monomer of said second monomer charge in order to form an insoluble compound in an amount which would substantially interfere with the free radical polymerization of said free radically polymerizable monomer of said first monomer charge or said free radically polymerizable monomer of said second monomer charge.

The resultant polymer is characterized by having the formula $I(A'A''_yT)_n$ where I, A', A", T and n are defined above and y is zero or 1, and by including residual metal compound accelerator.

DETAILED DESCRIPTION OF THE INVENTION

I. Accelerated Photoiniferter Polymerization

Thus, the present invention relates to the use of at least one metal compound accelerator during a photoiniferter polymerization reaction in order to dramatically increase the polymerization reaction rate.

Useful metal compounds include but are not limited to those of general formula $M_xL_z$ wherein M is a cation having a valency of z of a metal which is selected from the group consisting of tin, zinc, cobalt, titanium, palladium, and lead;

x is an integer of at least 1;

L is an anion having a valency of x which is selected from the group consisting of $C_{1-20}$ alkyl, -aryl, —OR, $NO_3^-$, $SO_4^=$, and $PO_4^{-3}$;

R is selected from the group consisting of $C_{1-20}$ alkyl and aryl; and z is an integer of at least 1.

Suitable metal compound accelerators include but are not limited to the following: $Sn_xL_z$, $Co_xL_z$, $Zn_xL_z$, $Ti_xL_z$, $Pb_xL_z$, $Pd_xL_z$, etc. and mixtures thereof.

Examples of specific metal compound accelerators include: $(C_4H_9)_2Sn(OCH_3)_2$, $(C_4H_9)_2Sn(OOCCH_3)_2$, $(C_4H_9)_3SnOOCCH_3$, cobalt octanoate, lead disulfone, $Zn(Oct)_2$, tin octanoate, etc.

Most preferably, the metal compound is selected from the group consisting of stannous 2-ethylhexanoate, $[Sn(Oct)_2]$, zinc 2-ethylhexanoate, $[Zn(Oct)_3]$, and mixtures thereof, for reasons of their high solubility in organic solvents and the very high acceleration rate obtained therewith.

The metal compound should be present in an amount sufficient to accelerate the polymerization of the free radically polymerizable monomer. Preferably, about 0.1 to about 10 mole % of metal compound is used based upon the monomer charge to which the metal compound is added in order to obtain a high rate of acceleration. Most preferably, about 1 to about 3 mole % of metal compound is used based upon the monomer charge to which the metal compound is added, for reasons of optimum acceleration and optimum performance of the final polymer. The metal compound accelerator used should be soluble in any organic solvent used or in free radically polymerizable monomer.

Above about 3 mole % of metal compound results in a plasticizing effect which is not desirable for some applications, but which could be desirable for certain applications such as pressure sensitive adhesive compositions. Also, the use of above about 3 mole % of metal compound has not been found to increase the acceleration rate to a greater extent than 3 mole %. The use of above about 10 mole % of metal compound accelerator results in the absorption of radiation from the radiant energy source, thus causing interference with the polymerization process.

According to the above described accelerated photoiniferter polymerization reaction either a first monomer charge or both a first monomer charge and a second monomer charge can be used in forming the polymer. When only a first monomer charge is used a polymer represented by the formula $I(A'T)_n$ is formed. When both a first monomer charge and a second monomer charge are used a copolymer represented by the formula $I(A'A''T)_n$ is formed. The first monomer charge can comprise one or more types of free radically polymerizable monomer compound. Similarily, the second monomer charge can comprise one or more types of free radically polymerizable compound.

An accelerator compound is present, of course, when only a first monomer charge is used in order to accelerate the polymerization reaction. If both a first monomer charge and second monomer charge are used a polymerization accelerating amount of an accelerator metal compound may be present during the polymerization of the first monomer charge, the second monomer charge, or both the first monomer charge and the second monomer charge. The stage or stages at which the accelerator compound is added depends upon a number of factors such as the reactivity and structure of the monomer which is being polymerized. In the case of two monomer charges, the metal compound accelerator is preferably added to the monomer charge comprising the less reactive monomer. In both the cases wherein one or two monomer charges are used, the accelerator compound is preferably added all at once rather than gradually in order to minimize interruption of the polymerization reaction.

In order to conduct the accelerated photoiniferter polymerization, the reactants, including the photoiniferter, free radically polymerizable monomer, and any solvent employed, are charged into an energy source-transparent vessel and therein subjected to the energy source. The reactants can be charged into the vessel in any order. Preferably, however, the solvent, photoiniferter, and monomer are combined to form a mixture prior to the addition of the metal compound accelerator. Most preferably, a mixture is formed by dissolving the photoiniferter in the solvent prior to the addition of the monomer charge. This is followed by the addition of the metal compound accelerator.

If only a first monomer charge is to be used, a polymerization accelerating amount of accelerator metal compound is added to the vessel as indicated above. If both a first monomer charge and second monomer charge is used a polymerization accelerating amount of the accelerator metal compound can be added to the vessel so that it is present during the polymerization of the first monomer charge or it can be added later so that it is present during the polymerization of the second monomer charge. Alternatively, an excess of accelerator metal compound can be added so that it is present during the polymerization of the first monomer charge and the second monomer charge.

The reaction is preferably conducted in a vessel with agitation to permit uniform exposure of the reactants to the energy source. While most of the reactions have been conducted by employing a batch process, it is possible to utilize the same technology in a continuous polymerization operation.

The reaction mixture may include a suitable inert solvent but it is not necessary since some of the monomeric materials are liquid themselves and may thus be charged into the reaction vessel without utilization of a solvent.

In the situation wherein two monomer charges are used, preferably the $I(A'T)_n$ block polymer formed from the first monomer charge, solvent, and second monomer charge are combined prior to the addition of the metal compound accelerator if the metal compound accelerator is used during the polymerization of the second monomer charge.

The solvent, if utilized in the free radical polymerization, may be any substance which is liquid in a temperature range of about $-10°$ C. to about $50°$ C., is substantially transparent to the energy source employed to permit dissociation of the iniferter to form free radicals, is inert to the reactants and product, and will not otherwise adversely affect the reaction. Suitable solvents include water, toluene, alkyl acetates such as ethyl acetate, alkanes such as hexane or heptane, and alcohols such as methyl alcohol, ethanol, isopropyl alcohol, and mixtures of one or more of these. Other solvent systems are useful. The amount of solvent is generally about 30 to 80 percent by weight based on the total weight of the reactants and solvent. In addition to solution polymerization herein described, the polymerization may be carried out by other well known techniques such as suspension, emulsion and bulk polymerization.

The particular energy source and its intensity are selected to result in dissociation of the iniferter to free radicals. When employing a photoiniferter which will dissociate upon exposure to ultraviolet light radiation, an ultraviolet light source is utilized. When employing a photoiniferter which will dissociate upon exposure to visible light radiation, a visible light source is utilized. A visible light source is preferably used since it is more convenient and is considered less hazardous. The intensity and rate of radiation is chosen so that it will advance the polymerization at a reasonable rate without deleteriously affecting the polymer segment being produced. A light source having a wavelength on the order of 200 to 800 nm spaced approximately 10 cm from the reactants to provide an exposure of 2 milliwatts per square centimeter has been found to produce suitable results. If the energy source is ultraviolet radiation, a suitable ultraviolet light transparent vessel is utilized.

In the presence of a polymerization accelerating amount of at least one metal compound, reaction times have been found to range from about 0.2 to about 5 hours, typically about 2.4 to about 5 hours for the majority of cases for the preparation of $I(A'T)_n$ and $I(A'A''T)_n$ depending upon the type of monomer used.

The iniferter is caused to dissociate to form free radicals by exposure to an appropriate energy source. The preferred iniferter is one which will dissociate upon exposure to a radiant energy source. The amount of iniferter used depends upon the molecular weight of the polymer desired. The more iniferter used, the lower the molecular weight of the resultant polymer.

Upon exposure to the energy source, the iniferter dissociates to form free radicals which promote free radical polymerization. Upon completion of the free radical polymerization of the free radically polymerizable monomer, the energy source is discontinued to permit the free radically polymerized segments to recombine with the terminator portion of the iniferter to form polymer segments. A second monomer charge may then be introduced if desired, which is free radically polymerizable to the block A', and the new mixture is exposed to the energy source to cause dissociation of the terminator radical and free radical polymerization of the second monomer charge onto the first polymer segment, that now being the initiator of the second free radical polymerization. Upon completion of polymerization of the second monomer charge, the energy source is terminated and the terminator portion of the iniferter recombines with the polymer block to provide a block copolymer of the formula $I(A'A''T)_n$.

The accelerated photoiniferter polymerization method of the present invention can be used in the preparation of a variety of copolymers including, but not limited to, acrylic block copolymers useful as toughened thermoplastics, acrylic block copolymers useful as pressure sensitive adhesives, vinyl siloxane copolymers, etc.

The use of accelerator metal compounds in the preparation of shaped dental articles comprising certain acrylic block copolymers is described in copending, concurrently filed U.S. patent application entitled "Dental Compositions, A Method of Making Shaped Dental Articles Via Photoiniferter Polymerization of the Dental Compositions, and Shaped Dental Articles Produced Thereby", Mitra, et al., Ser. No. 454,176, filed Dec. 21, 1989 incorporated by reference herein.

I.A. Accelerated Photoiniferter Polymerization of Acrylic Block Copolymers Useful as Toughened Thermoplastics The metal compound accelerator can be used according to the method of the present invention to accelerate the polymerization of the acrylic block copolymers prepared by the use of iniferter technology in copending U.S. application Ser. No. 212,593, Andrus Jr., et al., which is incorporated by reference herein.

The method is similar to that described above wherein with respect to the iniferter $I(T)_n$, n is an integer of at least 2 and the first monomer charge is selected from the group consisting of (i) acrylic monomer polymerizable to form an acrylic polymer block having a glass transition temperature of less than 0° C. and (ii) monomer polymerizable to form a thermoplastic polymer block having a glass transition temperature of at least 50° C. which is free radically polymerizable in the presence of $(I\cdot)_n$ to form a first polymer block;

and wherein a second monomer charge is added, wherein the second monomer charge is a member of the group consisting of monomer (i) and monomer (ii) which was not selected as the first monomer charge, the second monomer charge comprising monomer which is free radically polymerizable in the presence of $I(A'\cdot)_n$ to form a second polymer block.

The invention also relates to sheet materials containing the copolymer formed according to the above accelerated method.

The most preferred iniferters for producing the ABA block copolymers (wherein $A=A''$ and $B=A'$) are selected from the group consisting of xylylene bis (N,N-diethyl dithiocarbamate) and xylylene bis (N-carbazolyl dithiocarbamate).

I.B. Accelerated Photoiniferter Polymerization of Acrylic Block Copolymers Useful as Pressure Sensitive Adhesives The metal compound accelerator can also be used according to the method of the present invention to accelerate the polymerization of acrylic block copolymers having the requisite physical properties making them suitable for use in pressure sensitive adhesive compositions prepared by the use of iniferter technology in copending U.S. application, Ser. No. 07/212,594, Ali, et al., which is incorporated by reference herein.

This particular accelerated method is similar to the general acceleration method described above wherein said iniferter is represented by the general formula $I(T)_n$ wherein n is an integer of at least 2 and wherein the first monomer charge comprises acrylic monomer which is free radically polymerizable in the presence of $I(\cdot)_n$ to form an acrylic polymer block having a glass transition temperature of less than 0° C.;

and the second monomer charge comprises monomer which is free radically polymerizable in the presence of $I(A'\cdot)_n$ to form a thermoplastic block having a glass transition temperature of at least 30° C.;

and sufficient compatible tackifier is blended with the second monomer charge, $I(A'\cdot)_n$ and nT or $I(A'A''T)_n$ in order to endow $I(A'A''T)_n$ with adhesive tack.

The most preferred iniferters for producing the ABA block copolymers (wherein $A=A''$ and $B=A'$) according to the accelerated method of present invention are selected from the group consisting of xylylene bis (N,N-diethyl dithiocarbamate) and xylylene bis (N-carbazolyl dithiocarbamate).

The PSA compositions comprise reinforced acrylic ABA block copolymer of the formula $I(BAT)_n$, as previously defined, and adhesive tackifier. If tackifier is employed, the amount is selected to provide sufficient adhesive tack to make the composition useful as a PSA. This amount would typically be on the order of 0 to 150 parts by weight per 100 parts ABA block copolymer.

The adhesive copolymer compositions prepared in accordance with the present invention are easily coated upon suitable flexible or inflexible backing materials by conventional coating techniques to produce adhesive coated sheet materials in accordance with the present invention. The flexible backing material may be any material conventionally utilized as a tape backing or any other flexible material.

I.C. Accelerated Photoiniferter Polymerization of Vinyl-Siloxane Copolymers

The metal compound accelerator can also be used according to the method of the present invention to accelerate the polymerization of vinyl-siloxane copolymers described in copending U.S. application Ser. No. 07/393,550, Kumar, et al., Siloxane Iniferter Compounds, Block Copolymers Made Therewith and a Method of Making The Block Copolymer incorporated by reference herein. The vinyl siloxane copolymers prepared according to the accelerated method can be used to prepare coated sheet materials therewith as in copending U.S. application Ser. No. 07/393,557, Kumar, et al., General Purpose Siloxane Release Coatings, which is incorporated by reference herein.

The method is similar to the general acceleration method described above wherein the iniferter of the general formula $I(T)_n$ is represented by the formula wherein T and X are organic groups selected so that the T—X bond is capable of dissociating upon being subjected to an appropriate energy source to form a terminator free radical of the formula T· and an initiator free radical of the formula the initiator free radical being sufficiently reactive to initiate free radical polymerization of free radially polymerizable monomer and the terminator free radical being insufficiently capable of initiating free radical polymerization of free radically polymerizable monomer but capable of rejoining with the initiator free radical or a free radical polymer segment free radically polymerized with the initiator free radical; wherein $R^1$, $R^2$, $R^5$ and $R^6$ are monovalent moieties selected from the group consisting of hydrogen, $C_{1-4}$ alkyl $C_{1-4}$ alkoxy and aryl which can be the same or are different;

$R^3$ and $R^4$ are monovalent moieties which can be the same or different selected from the group consisting of $C_{1-4}$ alkyl, $C_{1-4}$ fluoroalkyl including at least one fluorine atom and aryl;

$R^1$, $R^2$, $R^3$, $R^4$, $R^5$ and $R^6$ are selected so that they do not prevent the initiator free radical from initiating free radical polymerization or the combining of the terminator free radical with the initiator free radical or a polymer free radical segment including the initiator free radical;

Y is selected from the group consisting of —X—T and —Z wherein X and T are defined above and Z is an organic moiety that will not dissociate to form free radicals when subjected to the energy source;

$Y_1$ is selected from the group consisting of —X· and —Z;

m is an integer of 10 or greater;

the exposing the first mixture to an energy source forms free radicals T· and the maintaining the exposure results in the polymerization of the initiator radical and the free radically polymerizable monomer of the first monomer charge to form a free radical block copolymer segment represented by the formula wherein A′ represents a polymer block comprising polymerized free radically polymerizable monomer of the first monomer charge; and G is selected from the group consisting of —Z and —X—A′·;

the terminating the exposure forms a block copolymer represented by the formula wherein P is selected from the group consisting of —X—A′—T and —Z, wherein X, A′, T, and Z are defined above or alternatively maintaining the exposure of and T·;

the optionally mixing or the mixing nT· and with the second monomer charge comprising free radically polymerizable monomer forms the second mixture;

the exposing the mixture of and the second monomer charge to an energy source capable of forming free radical T· and or alternatively maintaining the exposure of and nT·, which is mixed with the second monomer charge, to the energy source;

the maintaining the exposure results in the polymerization of the radically polymerizable monomer with the free radical to form a free radical block copolymer segment represented by the formula wherein A" represents a polymer block comprising polymerized free radically polymerizable second monomer; and K is selected from the group consisting of —X—A'—A"· and —Z; and the terminating the exposure results in the combining of and T· to form a block copolymer represented by the formula wherein N is selected from the group consisting of —X—A'A"T and —Z.

The present invention also relates to a coated sheet material similar to that described in U.S. application Ser. No. 07/393,550, incorporated by reference herein, comprising a flexible sheet material and a release coating prepared according to the accelerated method described above covering at least a portion of one major surface thereof wherein the release coating comprises a block copolymer having a formula selected from the group consisting of AB and ABA;

wherein A comprises at least one vinyl polymeric block;

wherein each polymeric block comprises polymerized free radically polymerizable monomer, wherein each polymeric block has a $T_g$ or $T_m$ above about $-20°$ C. and wherein A comprises at least about 40 weight percent of the block copolymer;

wherein B is a siloxane polymeric block having a number average molecular weight above about 1000;

and wherein the weight percent of said siloxane polymeric block is enough to provide said block copolymer with a surface release value not greater than about 50 Newtons/dm; and wherein the block copolymer has the formula wherein T, A, X, L, $R_1$, $R_2$, $R_3$, $R_4$, $R_5$ and $R_6$ are as previously defined.

EXAMPLES

The following detailed description includes exemplary accelerated preparations of acrylic copolymers useful as pressure sensitive adhesives, acrylic copolymers useful as toughened thermoplastics, and vinyl-siloxane copolymers. All parts and percentages are by weight unless otherwise specified.

Definitions of Terms

The number-average molecular weight ($\overline{M}_n$), and weight-average molecular weight ($\overline{M}_w$), are well known mathematical descriptions of the molecular weight distribution of a polymer sample.

Each of the foregoing is a well known term used by polymer chemists and others. Further explanation of the derivation of these terms may be found in *Experimental Methods in Polymer Chemistry*, Wiley and Sons, 1981, Chapter 3 entitled "Molecular Weight Averages", pages 57-61.

The block copolymers prepared according to the accelerated method of the present invention are described in a short-hand way depending upon the monomer forming each block. For example, MMA-b-BA-b-MMA refers to a copolymer having blocks ("b") of polymerized methyl methacrylate ("MMA") and a block of butyl acrylate ("BA"). For example, MMA-b-BA-b-MMA refers to an ABA block copolymer having two A (polymethyl methacrylate) blocks and a single B midblock (butyl acrylate).

Abbreviations

BA = Butyl acrylate;
MMA = Methyl methacrylate;
IOA = Isooctyl acrylate;
AA = Acrylic acid;
NVP = N-vinyl-2-pyrrolidone;
XDC = Xylylene bis(N,N-diethyl dithiocarbamate);
Sn(Oct)$_2$ = Stannous 2-ethylhexanoate; and
Zn(Oct)$_2$ = Zinc 2-ethylexanoate.

Test Methods

The test methods used to evaluate the block copolymers of the examples are industry standard tests. The test methods which characterize the polymers prepared according to the accelerated method of the invention are those which demonstrate its molecular architecture. The gel permeation chromatography (GPC), inherent viscosity (I.V.) modulus, percent elongation, and tensile strength measurement results have been obtained. The standard tests are described in detail in various publications of the American Society for Testing and Materials (ASTM), Philadelphia, Pa. The standard test methods are described in detail below. The reference source of each of the standard test methods is also given.

Gel Permeation Chromatography

The characterization of the molecular weight distribution of the polymers has been by conventional gel permeation chromatography (GPC). A Hewlett-Packard Model 1084B, high performance liquid chromatograph equipped with Styragel TM columns was used. The system was calibrated using polystyrene standards. All molecular weight averages are polystyrene equivalent molecular weights. The molecular weight averages and polydispersities were calculated according to accepted practices. GPC test methods are further explained in "Modern Size Exclusion Liquid Chromatography" *Practice of Gel Permeation Chromatography*, John Wiley and Sons, 1979.

Modulus—Elongation—Tensile Measurements

The mechanical properties of the films formed from the MMA-BA-MMA copolymer formed according to the method of this invention were measured according to the procedures established by the American Standard Test Methods (ASTM) which can be found under the designations: D-412-83, "Rubber Properties in Tension" and D 638M-84, "Tensile Properties of Plastics".

Preparation of films for test purposes occurred as follows. Films were cast from solution upon a substrate which permitted subjecting the film to 16 hours of drying in a vacuum oven at 50° C. The film thus formed was cut to standard dumbbell shapes in order to provide test samples for insertion into the jaws of an Instron TM tensile test instrument available from Instron Company (Model #1122) where they were tested under ambient conditions in a testing room controlled at 23° C. and a humidity of 50%.

The prescribed dumbbell-shaped specimens were stretched at a constant rate to the breaking point. The tensile strength at break was recorded. The elongation was expressed as a percentage of the original length. The modulus (stiffness) and tensile strength were calculated based on the following formulae where "force" is expressed in Newtons (N), linear dimensions in meters and the modulus and tensile units are expressed as mega pascals (MPa).

$$\text{Tensile} = \frac{\text{Force}}{\text{Width} \times \text{Thickness}}$$

$$\text{Modulus} = \frac{\text{Force} \times \text{Initial Length}}{\text{Width} \times \text{Thickness} \times \text{Final Length}}$$

$$\% \text{ Elongation at break} = \frac{\text{Final length} - \text{original length}}{\text{original length}} \times 100$$

EXAMPLE 1

Control Experiment Involving the Polymerization of BA with Photoiniferter Compound XDC in the Absence of both Stannous 2-ethylhexanoate and Zinc 2-ethylhexanoate A cylindrical reaction bottle was charged with 30 ml butyl acrylate (BA) monomer, 0.15 grams of xylylene bis(N,N-diethyl dithiocarbamate) (XDC) photoiniferter and 50 ml toluene solvent. The cylindrical reaction bottle was purged with nitrogen for 10 minutes before sealing and placing the sealed bottle in a roller mechanism. The rotating sealed bottle was exposed for 3 hours to ultraviolet radiation from six General Electric 15 watt cylindrical black light lamps. The reaction bottle was unsealed and $^1$H NMR spectroscopy was utilized to determine the percentage conversion of a small removed sample. The reaction bottle was again purged with nitrogen, resealed, and further subjected to ultraviolet radiation until a total exposure time of approximately 24 hours had elapsed. $^1$H NMR spectroscopy was again utilized to determine the percentage conversion of a small removed sample. The $^1$H NMR results for Example 1 are set forth in Table I below.

EXAMPLE 2

Polymerization of BA with XDC in Presence of Stannous 2-ethylhexanoate

The procedure of Example 1 was followed. The amount of components utilized were as follows: 30 ml of butyl acrylate monomer, 0.15 grams of xylylene bis(N,N-diethyl dithiocarbamate) (XDC) photoiniferter, 50 ml of toluene solvent. In addition, 1.54 grams of stannous 2-ethylhexanoate (metal compound accelerator) were charged into the reaction bottle before exposure to the ultraviolet radiation. Percentage conversion was determined by $^1$H NMR spectroscopy. The NMR results for Example 2 are reported in Table I below.

EXAMPLE 3

Polymerization of BA with XDC in Presence of Zinc 2-ethylhexanoate

The procedure of Example 2 was followed. The amount of components utilized were as follows: 30 ml of butyl acrylate monomer, 0.15 grams of (XDC) photoiniferter, 50 ml (43.3 grams) of toluene solvent, and 5.8 grams of zinc 2-ethylhexanoate (metal compound accelerator). The $^1$H NMR spectroscopy results for Example 3 are reported in Table I below.

TABLE I

| Example | Monomer BA | Difunctional Photoiniferter Compound XDC | Metal Compound Accelerator Sn(Oct)$_2$ | Metal Compound Accelerator Zn(Oct)$_2$ | Solvent Toluene | Exposure Time (hours) | Percentage Conversion (%)* |
|---|---|---|---|---|---|---|---|
| 1 | 30 ml | 0.15 g | 00 | 00 | 50 ml | 3 h | 28 |
|   | 30 ml | 0.15 g | 00 | 00 | 50 ml | ~24 h | 100 |
| 2 | 30 ml | 0.15 g | 1.54 g | 00 | 50 ml | 3 h | 87 |
|   | 30 ml | 0.15 g | 1.54 g |   | 50 ml | 4 h | 100 |
| 3 | 30 | 0.15 g | 00 | 5.9 g (22% solid) | 50 ml | 3 h | 44 |

*percentage conversion was determined by NMR.

The data contained in Table I above demonstrates that the rate of photopolymerization reactions are much faster in the presence of metal compound accelerators than photopolymerization reactions in the absence of metal compound accelerators.

Examples 4 and 5 describe the preparation of toughened thermoplastics.

EXAMPLE 4

Control Experiment Involving the Synthesis of Triblock Polymer MMA-BA-MMA in the Absence of Stannous 2-ethylhexanoate A cylindrical reaction bottle was charged with 113.3 grams of BA monomer, 0.75 grams of XDC photoiniferter and 113.3 grams of EtoAC solvent. The mixture was purged with nitrogen for 10 minutes before sealing and placing the sealed bottle in a roller mechanism. The rotating, sealed bottle was exposed to ultraviolet radiation from six General Electric 15 watt black light lamps 47 hours. At this point, the ultraviolet source was turned off. A percent solid calculation revealed greater than 98% reaction.

Into a second cylindrical reaction bottle of 120 ml was charged 20 grams of the above poly BA-XDC, 23.7 grams of methyl methacrylate monomer and 38.6 grams of ethyl acetate solvent. The reaction bottle was then purged for 10 minutes with nitrogen. The reaction bottle was then sealed and placed in the roller mechanism for further exposure to ultraviolet radiation which continued for 66 hours. The resulting triblock copolymer solution was removed. The composition of the resultant polymer was determined by $^1$H NMR spectroscopic analysis. A thin film of the triblock copolymer solution was cast and dried and then subjected to mechanical tests. The results of these tests are reported in Table II, Example 4.

EXAMPLE 5

Synthesis of Triblock Polymer MMA-BA-MMA in the Presence of Stannous 2-ethylhexanoate A cylindrical reaction bottle was charged with 7.05 g of dry polybutyl acrylate prepared according to the method of Example 4, 28.2 grams of methyl methacrylate monomer, 35.2 grams of toluene solvent and 14 grams of stannous 2-ethylhexanoate (metal compound accelerator). Purging for 10 minutes with nitrogen followed before the reaction bottle was sealed and placed in the roller mechanism. The rotating, sealed bottle was exposed to ultraviolet radiation from six General Electric 15 watt black light lamps for 6.6 hours. The resulting triblock copolymer solution was removed. The composition of the resultant polymer was determined by $^1$H NMR spectroscopic analysis. A thin film of the polymer was cast and dried and then subjected to mechanical tests. The results of these tests are reported in Table II, Example 5.

TABLE II

| Example | Composition | Exposure Time | Tensile Strength (MPa) | Modulus (MPa) | Elongation % |
|---|---|---|---|---|---|
| 4 | MMA—BA—MMA 36-28-36 made in absence of stannous 2-ethylhexanoate | 66 h | 20.65 | 452.018 | 10 |
| 5 | MMA—BA—MMA 40-20-40 made in presence of stannous 2-ethylhexanoate | 6.6 h | 22.9974 | 410.298 | 17 |

The data contained in Table II above demonstrates that copolymer of MMA-BA-MMA was prepared about 10 times faster in the presence of Sn(Oct)$_2$ than in absence of Sn(Oct)$_2$ with very similar mechanical properties observed.

EXAMPLES 6-10

An additional series of experiments were performed to attempt the polymerization of BA, without the use of an accelerator, with the use of stannous 2-ethylhexanoate as an accelerator, with the use of zinc 2-ethylhexanoate as an accelerator, with the use of both stannous 2-ethylhexanoate and zinc 2-ethylhexanoate as accelerators, without the use of initiator XDC (control experiment), etc. The results of the experiments are reported in Table III below. It was observed that the reaction rate was greater when the combination of accelerators stannous 2-ethylhexanoate and zinc 2-ethylhexanoate were used rather than the use of either accelerator stannous 2-ethylhexanoate or zinc 2-ethylhexanoate separately.

EXAMPLE 6

Control Experiment Involving the Polymerization of BA with XDC in the Absence of both Stannous 2-ethylhexanoate and Zinc 2-ethylhexanoate A 120 ml volume cylindrical reaction bottle was charged with 26.6 grams of BA monomer, 0.15 grams of XDC photoiniferter and 43 grams of toluene solvent. The mixture was purged with nitrogen for 10 minutes before sealing and placing the sealed bottle in a roller mechanism. The rotating, sealed bottle was exposed to ultraviolet radiation from six General Electric 15 watt black light lamps. The reaction was monitored from 10 minutes up to 24 hours. The percent conversion was determined by $^1$H NMR spectroscopy. The results are reported in Table III, Example 6. The percentage reaction versus time for Example 6 is plotted as line A in FIG. 1.

EXAMPLE 7

Polymerization of BA with XDC in Presence of Stannous 2-ethylhexanoate

A 120 ml volume cylindrical reaction bottle was charged with 26.6 grams of BA monomer, 0.15 grams of XDC photoiniferter, 43 grams of toluene solvent and 1.55 grams of stannous 2-ethylhexanoate accelerator metal compound. The mixture was purged with nitrogen for 10 minutes before sealing and placing the sealed bottle in a roller mechanism. The rotating, sealed bottle was exposed to ultraviolet radiation from six General Electric 15 watt black light lamps. The reaction was monitored from 10 minutes up to the completion of the reaction. The percent conversion was determined by $^1$H NMR spectroscopy. The results are reported in Table III, Example 7. The percentage reaction versus time for Example 7 is plotted as line B in FIG. 1.

EXAMPLE 8

Polymerization of BA with XDC in Presence of a Mixture of Stannous 2-ethylhexanoate and Zinc 2-ethylhexanoate A 120 ml volume cylindrical reaction bottle was charged with 26.6 grams of BA monomer, 0.15 grams of XDC photoiniferter, 43 grams of toluene solvent and 0.77 grams of stannous 2-ethylhexanoate (accelerator metal compound) and 0.15 gram (22% solid) of zinc 2-ethylhexanoate (accelerator metal compound). The mixture was purged with nitrogen for 10 minutes before sealing and placing the sealed bottle in a roller mechanism. The rotating, sealed bottle was exposed to ultraviolet radiation from six General Electric 15 watt black light lamps. The reaction was monitored from 10 minutes up to the completion of the reaction. The percent conversion was determined by $^1$H NMR spectroscopy. The results are reported in Table III, Example 8. The percentage reaction versus time for Example 8 is plated as line C in FIG. 1.

Figure 1:
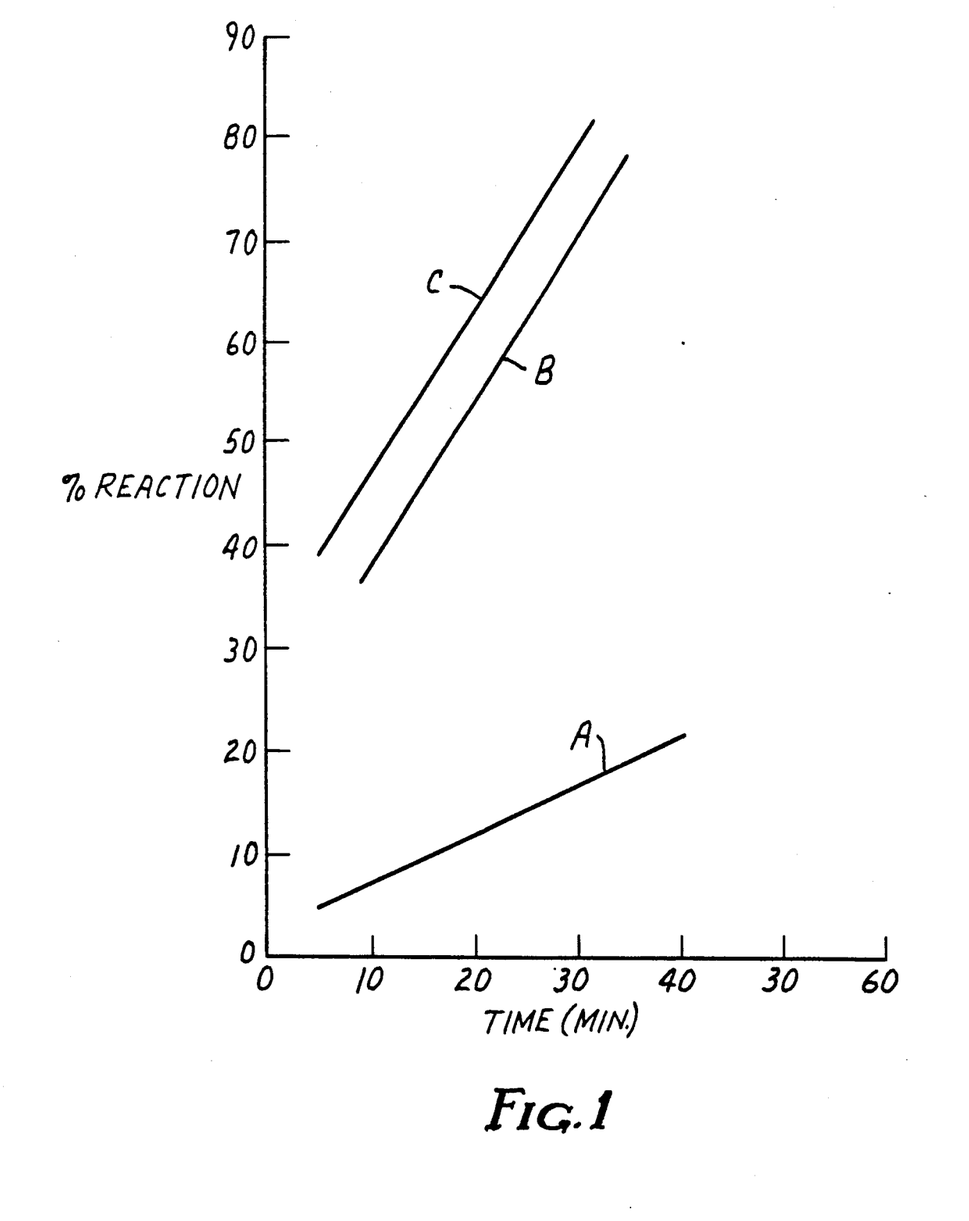
FIG. 1 compares the rates of polymerization obtained for butyl acrylate (BA) in the absence of an accelerator metal compound (line A), in the presence of accelerator metal compound tin octanoate $[Sn(Oct)_2]$ (line B), and in the presence of accelerator metal compounds tin octanoate $[Sn(Oct)_2]$ and zinc octanoate $[Zn(Oct)_2]$ (line C) according to Examples 6–8.

FIG. 1 contains a plot of percent conversion versus time for Examples 6, 7 and 8 designated as lines A, B, and C, respectively. FIG. 1 demonstrates that when photoiniferter reactions were performed in the presence and in the absence of metal accelerators, dramatically different slopes of the straight line plots were obtained.

In the presence of Sn(Oct)$_2$ (line B) the photoiniferter reaction rate was increased significantly. Even greater rate acceleration was observed when mixtures of Sn(Oct)$_2$ and Zn(Oct)$_2$ were used (line C).

EXAMPLE 9

Control Experiment to Determine whether Stannous 2-ethylhexanoate can Initiate Polymerization of BA Monomer in the Absence of a Photoiniferter A 120 ml volume cylindrical reaction bottle was charged with 26.6 grams of BA monomer, 1.56 grams of stannous 2-ethylhexanoate (accelerator metal compound) and 42.8 grams of toluene solvent. The mixture was purged with nitrogen for 10 minutes before sealing and placing the sealed bottle in a roller mechamism. The rotating, sealed bottle was exposed to ultraviolet radiation from six General Electric 15 watt black light lamps. The reaction was monitored from 10 minutes up to 3.7 hours of irradiation. The percent conversion was determined by $^1$H NMR spectroscopy. The results are reported in Table III, Example 9.

EXAMPLE 10

Control Experiment to Determine whether Zinc 2-ethylhexanoate can Initiate Polymerization of BA Monomer in the Absence of a Photoiniferter A 120 ml volume cylindrical reaction bottle was charged with 26.6 grams of BA monomer, 5.9 (22% solid) grams of zinc 2-ethylhexanoate (accelerator metal compound) and 43 grams of toluene solvent. The mixture was purged with nitrogen for 10 minutes before sealing and placing the sealed bottle in a roller mechamism. The rotating, sealed bottle was exposed to ultraviolet radiation from six General Electric 15 watt black light lamps. The reaction was monitored from 10 minutes up to 3.7 hours of irradiation. The percent conversion was determined by $^1$H NMR spectroscopy. The results are reported in Table III, Example 10.

TABLE III

| Exposure Time | Example 6 % Yield | Example 7 % Yield | Example 8 % Yield | Example 9 % Yield | Example 10 % Yield |
|---|---|---|---|---|---|
| 10 min | 9.2 | 41.5 | 49.8 | No Rxn. | No Rxn. |
| 20 min | 13 | 58.2 | 65.2 | No Rxn. | No Rxn. |
| 30 min | 19.9 | 68.3 | 76.5 | No Rxn. | No Rxn. |
| 1 hr | 33 | 79.7 | 87.8 | No Rxn. | No Rxn. |
| 3.7 hr | 66.8 | 92.5 | 100 | <5% | No Rxn. |
| ~24 hr | 100 | — | — | | |

Example 6 BA + XDC + Toluene (line A, FIG. 1) 26.6 g + 0.15 g + 43 g
Example 7 BA + XDC + Sn(Oct)$_2$ + Toluene (line B, FIG. 1) 26.6 g + 0.15 g + 1.55 g + 43 g
Example 8 BA + XDC + Zn(Oct)$_2$ + Sn(Oct)$_2$ + Toluene 26.6 g + 0.15 g + 3.0 g 22% solid + 0.77 g + 43 g (line C, FIG. 1)
Example 9 BA + Sn(Oct)$_2$ + Toluene 26.19 g + 1.56 g + 42.8 g
Example 10 BA + Zn(Oct)$_2$ + Toluene 26.6 g + 5.9 g 22% solid + 43 g

EXAMPLE 11

Polymerization of MMA with XDC

A 120 ml volume cylindrical reaction bottle was charged with 50 ml of MMA monomer and 0.3 grams of XDC photoiniferter. The mixture was purged with nitrogen for 10 minutes before sealing and placing the sealed bottle in a roller mechamism. The rotating, sealed bottle was exposed to ultraviolet radiation for 1 hour and 15 minutes from six General Electric 15 watt black light lamps. Analysis using $^1$H NMR spectroscopy revealed 22.7% conversion.

EXAMPLE 12

Polymerization of MMA with XDC in Presence of Stannous 2-ethylhexanoate

A 120 ml volume cylindrical reaction bottle was charged with 50 ml of MMA monomer, 0.3 grams XDC photoiniferter, 3.0 grams of stannous 2-ethylhexanoate (accelerator metal compound). The mixture was purged with nitrogen for 10 minutes before sealing and placing the sealed bottle in a roller mechanism. The rotating, sealed bottle was exposed to ultraviolet radiation for 1 hour and 15 minutes from six General Electric 15 watt black light lamps. Analysis using $^1$H NMR spectroscopy revealed 42% conversion.

Examples 11 and 12 demonstrate a greater rate of MMA polymerization in the presence of Sn(Oct)$_2$ compared to MMA polymerization in absence of Sn(Oct)$_2$.

EXAMPLE 13

Polymerization of NVP with XDC

A 120 ml volume cylindrical reaction bottle was charged with 28.25 grams of NVP monomer and 0.188 grams of XDC photoiniferter. The mixture was purged with nitrogen for 10 minutes before sealing and placing the sealed bottle in a roller mechanism. The rotating, sealed bottle was exposed to ultraviolet radiation for 1 hour and 15 minutes from six General Electric 15 watt black light lamps. A percent solid calculation revealed that 17.7% reaction of NVP occurred.

EXAMPLE 14

Polymerization of NVP with XDC in Presence of Stannous 2-ethylhexanoate

A 120 ml volume cylindrical reaction bottle was charged with 28.Z5 grams of NVP monomer, 0.188 grams of XDC photoiniferter and 2.07 grams of stannous 2-ethylhexanoate (accelerator metal compound). The mixture was purged with nitrogen for 10 minutes before sealing and placing the sealed bottle in a roller mechamism. The rotating, sealed bottle was exposed to ultraviolet radiation for 1 hour and 15 minutes from six General Electric 15 watt black light lamps. 48.7% conversion of polymerization reaction of NVP occurred which was determined by a percent solid analysis.

Examples 13 and 14 demonstrate a large rate enhancement of the photopolymerization of NVP monomer in the presence of accelerator compound compared to a photopolymerization reaction in the absence of accelerator compound. Examples 15 and 16 describe the preparation of pressure-sensitive adhesives.

EXAMPLE 15

Polymerization of IOA/AA with Photoiniferter Compound XDC

A cylindrical 16 oz. reaction bottle was charged with 98 grams of IOA monomer, 2 grams of AA monomer, 1.02 grams of XDC photoiniferter and 200 grams of EtoAc solvent. The mixture was purged with nitrogen for 10 minutes. The bottle was sealed and placed in a roller mechanism. The rotating, sealed bottle was exposed to ultraviolet radiation from six General Electric 15 watt black light lamps for 48 hours. A conversion of greater than 97% was obtained.

EXAMPLE 16

Polymerization of P-(IOA/AA) with MMA in Presence of Stannous 2-ethylhexanoate A 50 g portion of the polymer solution P-(IOA/AA) from Example 15 was charged into a 100 ml volume flask and the solvent was removed by rotary evaporation under vacuum. Into a small 4 ml volume vial 1.72 grams of P-(IOA/AA) polymer, 0.42 grams of MMA monomer and 0.11 grams of stannous 2-ethylhexanoate (accelerator metal compound) were charged and the vial was placed in a shaker for homogeneous mixing. The solution was coated on a polyester film. The film was placed under General Electric 15 watt black light lamps and irradiated for 10 minutes. The polymer coated film was conditioned for 24 hours in a constant temperature testing room at 22° C. and 50% relative humidity, after which a shear strength test was performed. A shear value of 311 minutes was obtained.

EXAMPLE 17

Polymerization of P-(IOA/AA) with MMA

Following the procedure of Example 16, 1.20 grams of dry P-(IOA/AA) polymer prepared according to Example 15 and 0.30 grams of MMA monomer were charged into a 4 ml volume vial which was placed in a shaker for mixing for 15 minutes in order to form a homogeneous solution. The homogeneous solution was coated onto a polyester film. The film was exposed for 10 minutes to ultraviolet radiation from six General Electric 15 watt black light lamps. The polymer coated film was conditioned for 24 hours in a constant temperature testing room at 22° C. and 50% relative humidity, after which a shear strength test was performed. A shear value of less than one minute was obtained.

Examples 16 and 17 demonstrate that MMA incorporation into the midblock of a polymer prepared according to photoiniferter polymerization is much greater in the presence of accelerator compound as shown by the greater shear strength of the polymer prepared therewith.

EXAMPLE 18

Kinetic Studies Performed Using Varying Concentrations of Stannous 2-ethylhexanoate Metal Compound Accelerator in the Polymerization of Butyl Acrylate In order to gain insight into the enhanced polymerization rate obtained using metal compound accelerators, kinetic studies were performed using varying amounts of stannous 2-ethylhexanoate metal compound accelerator during the polymerization of BA by use of a photoiniferter. The reaction components were charged into 8 separate 120 ml clear glass bottles which were purged with nitrogen for 10 minutes before sealing and placing the sealed bottle in a roller mechanism. Each rotating sealed bottle was exposed to ultraviolet radiation from six General Electric 15 watt black light lamps for 1 hour. The reaction components included 28 g of BA, 0.2 g XDC, 28g toluene and varying amounts of stannous 2-ethylhexanoate.

The reaction can be represented by the following equation :

wherein X TM mole % of stannous 2-ethylhexanoate. Percent solid calculations were used to determine the percent conversion, the results of which are shown in FIG. 1. FIG. 1 clearly demonstrates that samples containing higher levels of stannous 2-ethylhexanoate metal compound accelerator (shown in mole % of the monomer BA) polymerize more efficiently than the control sample which contained no stannous 2-ethylhexanoate. The most efficient polymerization occurred in the range of 2–3 mole % stannous 2-ethylhexanoate. Lower conversion values were observed for amounts much greater or much less than 2-3 mole% stannous 2-ethylhexanoate when irradiated for shorter times.

However, with longer irradiation times and conversions near completion (~85%) the reactivity difference between varying amounts of stannous 2-ethylhexanoate was small except for at very low levels of stannous 2-ethylhexanoate. The results of the experiment with respect to the long irradiation times are reported in Table IV below.

TABLE IV

| Mole % | Irradiation Time | % Conversion |
|---|---|---|
| 0.0 | 1 hour | 28 |
| 0.1 | 1 hour | 77 |
| 0.5 | 1 hour | 87 |
| 1.0 | 1 hour | 86 |
| 2.0 | 1 hour | 88 |
| 3.0 | 1 hour | 87 |
| 4.0 | 1 hour | 88 |
| 6.0 | 1 hour | 86 |
| 10.0 | 1 hour | 84 |

It was observed that the use of 0.5–1 mole % stannous 2-ethylhexanoate resulted in approximately the same percent conversion as the use of higher percentages of stannous 2-ethylhexanoate. Thus, the use of 0.5–1 mole % of stannous 2-ethylhexanoate would be more economical.

The low and high conversion kinetic studies suggest that the rate of acceleration of the photoiniferter reactions using stannous 2-ethylhexanoate is probably due to several factors Although we do not wish to be limited to a particular mechamism, we believe that one of the roles of the accelerator stannous 2-ethylhexanoate may be that of oxygen scavenging. Oxygen is an inhibitor which combines with free radically polymerizable monomer thus hindering polymerization. This is the known role of stannous 2-ethylhexanoate in conventional photopolymerization reactions which is demonstrated by the lower induction time exhibited by such a reaction conducted with stannous 2-ethylhexanoate in FIG. 2, line D of Example 19.

We believe that a second role of stannous 2-ethylhexanoate accelerator metal compound may be the complexing action of stannous 2-ethylhexanoate with the free radically polymerizable monomer. The higher percent conversion of butyl acrylate obtained with a higher percentage of stannous 2-ethylhexanoate (0.1 mole vs. 0.5 mole and above, Table IV) may indicate such a complexation mechanism.

We believe that a third role of stannous 2-ethylhexanoate metal compound accelerator may be the removal of the terminating radical by stannous 2-ethylhexanoate. Stannous 2-ethylhexanoate may selectively remove the terminating radical without reacting with the propagating polymer radical and thus enhance the polymerization reaction. This enhanced polymerization rate which occurs in the presence of stannous 2-ethylhexanoate is shown by the higher slope obtained when accelerator stannous 2-ethylhexanoate was used compared to a control reaction in which no stannous 2-ethylhexanoate was used. See FIG. 1, lines B and A, respectively.

Figure 2:
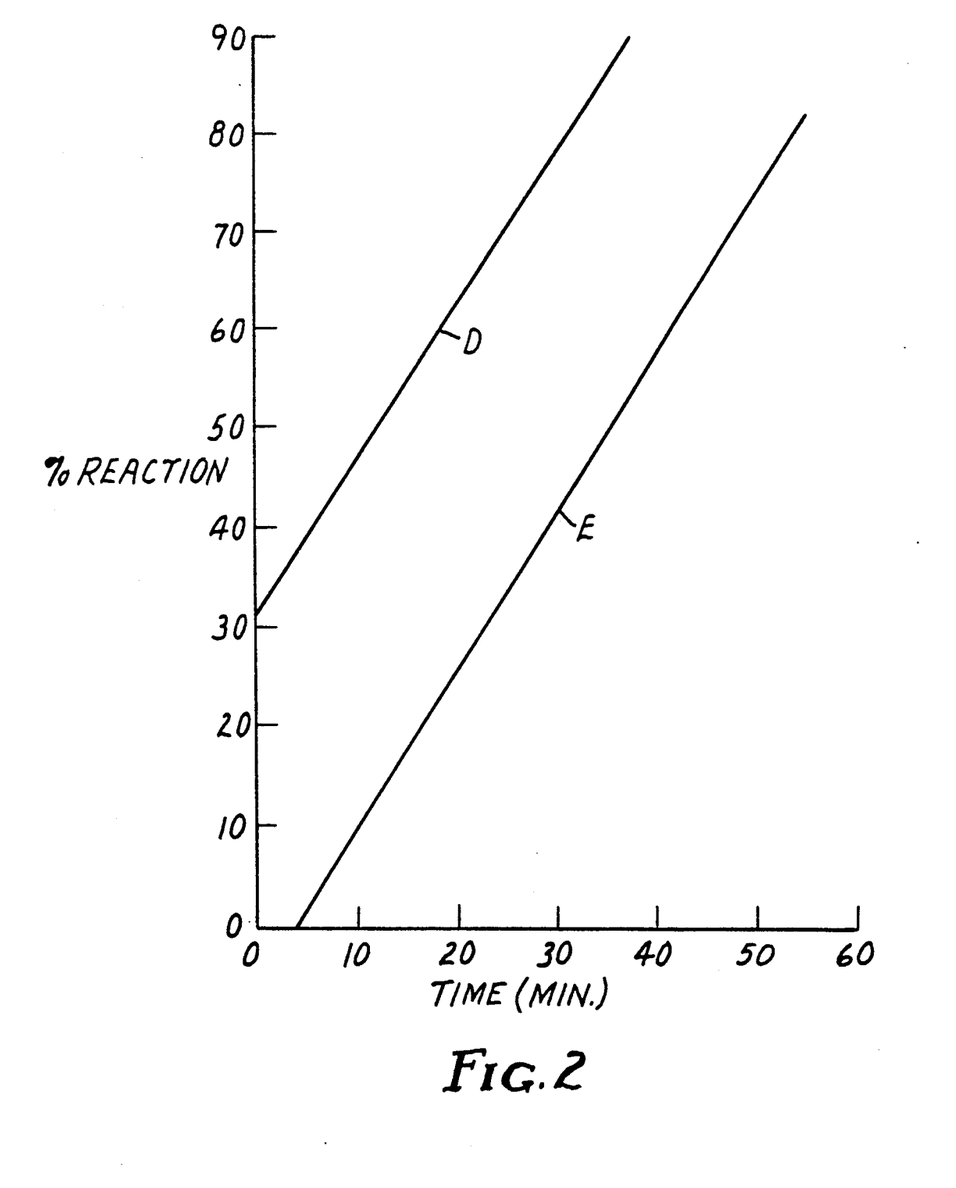
FIG. 2 compares the rates of polymerization of BA obtained during conventional photopolymerizations in the presence of $Sn(Oct)_2$ (line D) and in the absence of $Sn(Oct)_2$ (line E) according to Example 19.

This higher rate suggests that the acceleration of the photoiniferter reaction by stannous 2-ethylhexanoate is due to more than oxygen scavenging. The effect of stannous 2-ethylhexanoate in conventional photopolymerization is principally reduction of oxygen inhibition as shown in FIG. 2, line E.

Although I do not wish to be limited to any particular mechanism I theorize that the metal compound accelerator used to accelerate the free radical polymerization remains in its initial form intermixed within the polymer or copolymer system formed by the accelerated method. It is possible that a minor portion of the metal compound accelerator may become incorporated into the polymer or copolymer produced thereby. It is also possible that a minor portion of the metal compound accelerator may become involved in side reactions involving $H_2O$, $O_2$, etc.

EXAMPLE 19

Effect of Stannous 2-ethylhexanoate on the Polymerization of Butyl Acrylate Using a Conventional Initiator The effect of stannous 2-ethylhexanoate on the polymerization of butyl acrylate with conventional initiator Irgacure 651 (2,2-dimethoxy-2-phenyl acetophenone), available from Ciba-Geigy according to the procedure of Example 6 was studied. The reaction components are listed below.

| Plot | BA | + | Irgacure 651 | + | Toluene | + | 2-ethylhexanoate |
|---|---|---|---|---|---|---|---|
| D | 26.6 g | | 0.1 g | | 43 g | | 1.6 g |
| E | 26.6 g | | 0.1 g | | 43 g | | 0 |

The results are plotted as lines D and E in FIG. 2. The data does not indicate any rate enhancement besides the decreased induction period in the presence of stannous 2-ethylhexanoate. The slope of each plot is the same which is indicative of the same reaction rate.

EXAMPLE 20

Synthesis of Siloxane Iniferter Compound

A. Synthesis of 1-(dimethylchlorosilyl)-2-(p,m-chloromethyl-phenyl)ethane (1):

Into a 100 ml flask were charged 10g of 1-(dimethylchlorosily)-2-(p,m chloro-methylphenyl)ethane and 50 g of $H_2O$. The mixture was stirred at room temperature for 4 hours. Next, 50 ml of ether was added to the flask and the flask contents were stirred for 15 minutes. The flask contents were then transferred to a separatory funnel. The ether layer was separated out and washed with 50 ml of $H_2O$ each four times. The ether layer was dried over anhydrous $MgSO_4$, filtered and rotary evaporated out to remove the solvent. A viscous colorless liquid was obtained.

B. Synthesis of

Into a 250 ml three necked flask fitted with a magnetic stirrer, condenser, thermometer and nitrogen in/-outlet were charged compound (1) from Step A (6.05 g), $D_4$ (61 g) and Darco 60 carbon black (6.7 g). After stirring the mixture for 10 minutes, $H_2SO_4$ (0.34 g) was added. The mixture was heated at 90° C. for 6 hours while the system was kept under nitrogen atmosphere. The mixture was then filtered The viscous liquid was placed in a vacuum oven at 90° C. overnight.

C. Synthesis of

Into a 100 ml flask were charged compound (2) (10.2 g) from Step B, 1.2 g of and 20 g of THF. The mixture was stirred overnight at room temperature. A solid precipitate of NaCl was formed. The reaction mixture was filtered and the THF was rotary evaporated out at 50° C. A viscous clear liquid was obtained. Hexane (50 g) was added to the liquid. The hexane layer was washed 5 times with water. The hexane layer was dried over anhydrous $MgSO_4$, filtered and dried by rotary evaporation. A viscous liquid was obtained for which $^1H$ NMR and IR spectroscopy revealed the formation of compound (3). GPC analysis revealed $\overline{M}n = 7,674$ and $\rho = 3.1$

EXAMPLE 21

Differential Photocalorimetry Studies Comparing The Rate of Reaction In The Presence And In The Absence of Stannous 2-ethylhexanoate (i) Reaction of BA with XDC in the Presence of Stannous 2-ethylhexanoate:

Into a 10 ml volume vial was charged 5 g BA, 0.0286 g XDC and 0.3 g (2 mole %) stannous 2-ethylhexanoate. The vial was then sealed and shaken to mix the vial contents in order to form a solution. Into a circular pan having a diameter of 6.6 mm and a depth of 1.6 mm pan, was charged 14.4 mg of the above solution. The pan was placed in the photocell chamber of a Differential Photocalorimetor (model #930, DuPont). The cell was kept under nitrogen atmosphere and the sample was irradiated by a high pressure mercury 200 Watt arc lamp for 2 minutes. The observed enthalpy was 241.9 J/g.

(ii) Reaction of BA with XDC:

A solution was made by mixing 5 g BA and 0.0286 g XDC according to the procedure of Example 21(i). A 13.6 mg sample of the solution was irradiated for 2 minutes as in Example 21(i). An enthalpy of 34.5 J/g was observed. Thus, Examples 21(i) and Example 21(ii) demonstrated that the photoiniferter polymerization of BA in the presence of stannous 2-ethylhexanoate occurred seven times faster than in the absence of stannous 2-ethylhexanoate.

(iii) Reaction of MMA with XDC in the Presence of Stannous 2-ethylhexanoate:

Following the procedure described in Example 21(i), a solution was prepared by mixing 10 g of MMA, 0.06 g of XDC and 0.6 g of stannous 2-ethylhexanoate. A 10.0 mg sample of the above solution was irradiated for 2 minutes as described in Example 21(i). An enthalpy of 23.6 J/g was observed.

(iv) Reaction of MMA with XDC:

Following the procedure described in Example 21(i), a solution of 10 g MMA and 0.06 g XDC was prepared and a 13.9 mg sample was irradiated for 2 minutes as in Example 1. No heat of evolution was observed indicating that no reaction occurred.

(v) Reaction of Siloxane Iniferter with BA in the Presence of Stannous 2-ethylhexanoate:

Following the procedure described in Example 11(i) a solution of 0.27 g siloxane iniferter from Example 20 (m.w. TM 7,674) of the formula 0.4 g BA and 0.02 g (1.58 mole %) stannous 2-ethylhexanoate was prepared. A 13.1 mg sample was irradiated following the procedure described in Example 21(i). An enthalpy of 133.6 J/g was observed.

(vi) Reaction of Siloxane Iniferter with BA:

A solution of 0.2 g siloxane iniferter from Example 20 and 0.4 g BA was prepared. A 10.8 mg sample of the solution was irradiated as in Example 21(i). An enthalpy of 44.0 J/g was observed. Thus, the reaction of the siloxane iniferter with BA in the presence of stannous 2-ethylhexanoate was three times faster than the siloxane iniferter reaction with BA in the absence of stannous 2-ethylhexanoate.

(vii) Reaction of Siloxane Iniferter with MMA in the Presence of Stannous 2-ethylhexanoate:

A solution of 0.27 g siloxane iniferter from Example 20, 0.8 g MMA, and 0.065 g (2 mole %) stannous 2-ethylhexanoate was prepared according to the procedure of Example 21(i). A 14.1 mg portion of this sample was irradiated following the procedure described in Example 21(i). An enthalpy of 31.4 J/g was observed.

(viii) Reaction of Siloxane Iniferter with MMA:

A solution of 0.1 g of siloxane iniferter from Example 20 and 0.3 g MMA was prepared. A 12.2 mg sample of the solution was irradiated according to the procedure of Example 21(i). An enthalpy of 10.5 J/g was observed.

Since the rate of reaction is directly proportional to the rate of heat evolution (i.e., enthalpy) Example 21 thus demonstrates that for photoiniferter reactions whether monoiniferters or macroiniferters are used, the rate of polymerization are much greater in the presence of the metal compound accelerator than in absence of the metal compound accelerator.

While this invention has been described in connection with specific embodiments, it should be understood that it is capable of further modification. The claims herein are intended to cover those variations which one skilled in the art would recognize as the chemical equivalent of what has been described here.

I claim:

1. A method of making a polymer which comprises mixing (i) an iniferter represented by the general formula $I(T)_n$, capable upon being subjected to an appropriate energy source of forming a terminator free radical of the formula $nT\cdot$ and an initiator free radical of the formula $I(\cdot)_n$ wherein n is an integer of at least 1, wherein the initiator free radical $I\cdot$ is a highly reactive free radical capable of initiating free radical polymerization, and the terminator free radical $T\cdot$ is a less reactive free radical which is generally much less capable of initiating free radical polymerization of free radically polymerizable monomer but capable of rejoining with $I(\cdot)_n$ or a free radical polymer segment free radically polymerized with $I(\cdot)_n$ upon termination of said energy source and (ii) a first monomer charge comprising free radically polymerizable monomer in order to form a first minute wherein $I(T)_n$ is selected from the group consisting of xylylene bis (N,N-diethyl dithiocarbamate) and xylylene bis (N-carbazolyl dithiocarbamate);

exposing the mixture to an energy source capable of forming free radicals $I\cdot$ and $nT\cdot$;

maintaining the exposure until said free radically polymerizable monomer of said first monomer charge polymerizes with $I\cdot$ to form a free radical polymer segment represented by the formula $IA'\cdot$, wherein $A'$ comprises a polymer block comprising polymerized free radically polymerizable monomer of said first monomer charge;

terminating said exposure, whereby $I(A'\cdot)_n$ and $nT\cdot$ combine to form a polymer represented by the formula $I(A'T)_n$ or alternatively maintaining the exposure of $I(A'\cdot)_n$ and $nT\cdot$ to said energy source;

optionally mixing $I(A'T)_n$ or mixing $I(A'\cdot)_n$ and $nT\cdot$ with a second monomer charge comprising free radically polymerizable monomer in order to form a second mixture;

exposing the mixture of $I(A'T)_n$ and said second monomer charge to an energy source capable of forming free radicals $I(A'\cdot)_n$ and $nT\cdot$ or alternatively maintaining the exposure of $I(A'\cdot)_n$ and $nT\cdot$, which is mixed with said second monomer charge, to said energy source;

maintaining said exposure until the free radically polymerizable monomer of said second monomer charge polymerizes with the free radical $I(A'\cdot)_n$ to form a free radical copolymer segment represented by the formula $I(A'A''\cdot)_n$ wherein $A''$ comprises a polymer block comprising polymerized free radically polymerizable monomer of said second monomer charge;

and terminating said exposure whereby $I(A'A''\cdot)_n$ and $nT\cdot$ combine to form a block copolymer represented by the formula $I(A'A''T)_n$:

wherein the improvement comprises adding a polymerization accelerating amount of at least one metal compound, wherein said metal compound is present during the polymerization of at least one monomer charge, and wherein said metal compound does not interact with said free radically polymerizable monomer of said first monomer charge or said free radically polymerizable monomer of said second monomer charge in order to form an insoluble compound in an amount which would substantially interfere with the free radical polymerization of said free radically polymerizable monomer of said first monomer charge or said free radically polymerizable monomer of said second monomer charge and wherein $I(A'T)_n$ or $I(A'A''T)_n$ is characterized by including residual metal compound wherein the metal compound is represented by the general formula $M_xL_z$ wherein M is a cation having a valency of z of a metal which is selected from the group consisting of tin, zinc, cobalt, titanium, palladium, and lead;

x is an integer of at least 1;

L is an anion having a valency of x which is selected from the group consisting of $C_{1-20}$ alkyl, -aryl, —OR, $NO_3-$, $SO_4=$, and $PO_4^{-3}$;

R is selected from the group consisting of $C_{1-20}$ alkyl, aryl; and z is an integer of at least 1.

2. The method of claim 1 wherein only the first monomer charge is used in order to form a polymer represented by the formula $I(A'T)_n$.

3. The method of claim 2 wherein the first monomer charge comprises at least two different types of monomer.

4. The method of claim 1 wherein both the first monomer charge and second monomer charge are used in order to form a block copolymer represented by the formula $I(A'A''T)_n$.

5. The method of claim 4 wherein the first monomer charge comprises at least two different types of monomer and wherein the second monomer charge comprises at least two different types of monomer.

6. The method of claim 1 wherein the metal compound is selected from the group consisting of stannous 2-ethylhexanoate, zinc 2-ethylhexanoate, and mixtures thereof.

7. The method of claim 1 wherein said polymerization accelerating amount is about 0.1 to about 10 mole % of metal compound based upon the monomer charge to which the metal compound is added.

8. The method of claim 7 wherein said polymerization accelerating amount is about 1 to about 3 mole % of metal compound based upon the monomer charge to which the metal compound is added.

9. A method of making an acrylic block copolymer comprising the method of claim 1 wherein said iniferter is represented by the general formula $I(T)_n$ wherein n is an integer of at least 2 and said first monomer charge is selected from the group consisting of (i) acrylic monomer polymerizable to form an acrylic polymer block having a glass transition temperature of less than 0° C. and (ii) monomer polymerizable to form a thermoplastic polymer block having a glass transition temperature of at least 50° C. which is free radically polymerizable in the presence of $I(\cdot)_n$ to form a first polymer block;

and including the addition of a second monomer charge, wherein said second monomer charge is a member of the group consisting of monomer (i) and monomer (ii) which was not selected as said first monomer charge, said second monomer charge comprising monomer which is free radically polymerizable in the presence of $I(A'\cdot)_n$ to form a second polymer block.

10. The method of claim 9 which further comprises the step of forming a sheet material from the block polymer $I(A'A''T)_n$.

11. A method of making a pressure-sensitive adhesive composition comprising the method of claim 1 wherein said iniferter is represented by the general formula $I(T)_n$ wherein n is an integer of at least 2 and wherein said first monomer charge comprises acrylic monomer which is free radially polymerizable in the presence of $I(\cdot)_n$ to form an acrylic polymer block having a glass transition temperature of less than 0° C. and said second monomer charge comprises monomer which is free radically polymerizable in the presence of $I(A'\cdot)_n$ to form a thermoplasic block having a glass transition temperature of at least 30° C.;

and the further step of adding sufficient compatible tackifier to said second monomer charge, $I(A'\cdot)_n$ and $nT$, or $I(A'A''T)_n$ in order to endow $I(A'A''T)_n$ with adhesive tack.

12. A method of making an adhesive coated sheet material comprising the steps of claim 11 and the further step of coating a backing with said pressure-sensitive adhesive composition.

* * * * *

UNITED STATES PATENT AND TRADEMARK OFFICE
CERTIFICATE OF CORRECTION

PATENT NO. : 5,093,385
DATED : 03/03/92
INVENTOR(S) : Mahfuza B. Ali

It is certified that error appears in the above-identified patent and that said Letters Patent is hereby corrected as shown below:

Col. 9, line 58  should read

Col. 10, line 16  should read

UNITED STATES PATENT AND TRADEMARK OFFICE
CERTIFICATE OF CORRECTION

PATENT NO. : 5.093,385

DATED : 03/03/92

INVENTOR(S) : Mahfuza B. Ali

It is certified that error appears in the above-identified patent and that said Letters Patent is hereby corrected as shown below:

Col. 10, line 53  should read

Col. 11, line 6  should read

UNITED STATES PATENT AND TRADEMARK OFFICE
CERTIFICATE OF CORRECTION

PATENT NO. : 5,093,385
DATED : March 3, 1992
INVENTOR(S) : Mahfuza B. Ali

It is certified that error appears in the above-identified patent and that said Letters Patent is hereby corrected as shown below:

Col. 18, line 38   "28.Z5" should read --28.25--

Col. 20, line 7    "X TM mole" should read --X = mole--

Col. 23, line 36   "11(i)" should read --21(i)--

Col. 24, line 36   "minute" should read --mixture--

Signed and Sealed this

Twenty-fifth Day of January, 1994

Attest:

BRUCE LEHMAN

Attesting Officer     Commissioner of Patents and Trademarks